United States Patent Office 3,008,795
Patented Nov. 14, 1961

3,008,795
PROCESS FOR LEVELLING THE ACTION OF CHLORINE ON WOOL
Ernst Honold, Buchschlag, Kreis Offenbach, and Josef Nikolai, Frankfurt am Main-Sindlingen, Germany, assignors to Cassella Farbwerke Mainkur Aktiengesellschaft, Frankfurt am Main-Fechenheim, Germany, a German company
No Drawing. Filed May 20, 1958, Ser. No. 736,452
Claims priority, application Germany May 21, 1957
4 Claims. (Cl. 8—128)

It is already known how to give a felt- and shrink-proof finish to wool and mixed wool articles by treatment with chlorine. During this process, however, the chlorination turned out to be uneven and thus to resistance to shrinking and felting, too, proved to be often unequal.

It has now been found that wool and mixed wool articles may be chlorinated evenly so as to obtain a regular felt- and shrink-proof finish by effecting the chlorination in an acidic aqueous medium in the presence of condensation compounds obtained by the treatment of highly molecular polyalkylene polyamines free of hydroxyl groups with alkylating agents also free of hydroxyl groups and which are capable of alkylating at least at two positions in their molecule.

The German Patent No. 874,757 describes the preparation of these condensation compounds. According to the mentioned patent specification, these compounds are utilized for the levelling of dyeings. The condensation products which are utilized for the present invention are prepared in accordance with the Examples 1–3 of the German patent specification 874,757. In these examples, one part of the polyalkylene polyamine is reacted with 0.6–1.3 parts of alkylene dihalide to form condensation compounds.

It has already been proposed to use for the levelling of the chlorination of wool material betaine compounds, melamine resins, fatty acid-albumin-condensation products or toluene-chloro-sulfamides. In contradistinction to these known procedures, the present process shows the advantage of achieving the same result with considerably less quantities than with the use of betaine compounds and of achieving a much better levelling effect than with the use of fatty acid-albumin-condensation products, toluene-chloro-sulfamides and melamine resins. Moreover, in the presence of the condensation products according to the present invention, the chlorination proceeds very smoothly while a precipitation of resins often can not be avoided in cases where the known agents e.g. some melamine resins are employed.

*Example*

1000 g. woolen yarn are treated in 30 liters of water containing in a dissolved condition 0.4 g. of a condensation compound of polyethylene polyamine and ethylene dichloride (the preparation of which condensation compound is described below), 100 g. sodium acetate, 100 g. 60% acetic acid and 20 g. active chlorine (in the form of commercial sodium hypochlorite), for 1½ hours in the cold at a pH of about 5. Then the mass is dechlorinated by means of 50 g. sodium bisulfite.

An evenly chlorinated wool is obtained which is fast to shrinking and felting when subjected to washing and milling in a neutral, acid, or alkaline medium.

The condensation compound mentioned above is prepared as follows:

From a mixture of polyethylene polyamines, obtained by treating aqueous ammonia with ethylene dichloride (Berichte 23, p. 3711) the fractions boiling under 10 mm. pressure up to 220° C. are distilled off as described in the example of U.S. Patent 2,040,061. 100 g. of the residue are dissolved in 160 g. water and 60 g. ethylene dichloride are added; the mass is allowed to boil under reflux until all the ethylene dichloride has reacted, i.e. for about 10–12 hours. Thus the reaction product is obtained as an approximately 50% solution which may be neutralized by an addition of acids and adjusted to the desired degree of dilution by means of water.

An analogous result is obtained by replacing the mentioned condensation product in this example by condensation product prepared in an analogous way from dipropylene triamine and ethylene dichloride.

What we claim is:
1. A process for the levelling of the chlorine action on wool and mixed wool material which process comprises treating said materials at about room temperature with a dilute aqueous solution having a pH of about 5 and containing a substance selected from the group consisting of alkali hypochlorites in the presence of a condensation product of high molecular weight obtained by reacting one part of polyalkylene polyamine per 0.6–1.3 parts of alkylene dihalide.

2. Wool and mixed wool material chlorinated at about room temperature with a dilute aqueous solution having a pH of about 5 and containing a substance selected from the group consisting of alkali hypochlorites in the presence of a condensation product of high molecular weight obtained by reacting one part of polyalkylene polyamine per 0.6–1.3 parts of alkylene dihalide.

3. A process for the levelling of the chlorine action on wool and mixed wool material which process comprises treating said material at about room temperature with a dilute aqueous solution having a pH of about 5 and consisting of a substance selected from the group consisting of alkali hypochlorites in the presence of a condensation product of high molecular weight obtained by reacting one part of polyalkylene polyamine per 0.6–1.3 parts of alkylene dihalide.

4. Wool and mixed wool material chlorinated at about room temperature with a dilute aqueous solution having a pH of about 5 and consisting of a substance selected from the group consisting of alkali hypochlorites in the presence of a condensation product of high molecular weight obtained by reacting one part of polyalkylene polyamine per 0.6–1.3 parts of alkylene dihalide.

References Cited in the file of this patent
UNITED STATES PATENTS

| | | |
|---|---|---|
| 2,040,061 | Munz et al. | May 5, 1936 |
| 2,135,633 | Bienert et al. | Nov. 8, 1938 |
| 2,267,205 | Kyrides | Dec. 23, 1941 |
| 2,429,082 | Stevenson et al. | Oct. 14, 1947 |
| 2,499,987 | Clapham et al. | Mar. 7, 1950 |
| 2,663,616 | Sulzer | Dec. 22, 1953 |
| 2,671,006 | McLauchlan | Mar. 2, 1954 |
| 2,702,737 | Koons et al. | Feb. 22, 1955 |

FOREIGN PATENTS

| | | |
|---|---|---|
| 874,757 | Germany | Apr. 27, 1953 |